US012560717B2

(12) United States Patent
Pude et al.

(10) Patent No.: US 12,560,717 B2
(45) Date of Patent: Feb. 24, 2026

(54) TECHNIQUES FOR CONFIGURABLE TRANSIMPEDANCE AMPLIFIER FOR FMCW LIDAR SYSTEMS

(71) Applicant: AEVA, INC., Mountain View, CA (US)

(72) Inventors: Mark Pude, Honeoye Falls, NY (US); Murat Ozbas, Penfield, NY (US)

(73) Assignee: Aeva, Inc., Mountain View, CA (US)

( * ) Notice: Subject to any disclaimer, the term of this patent is extended or adjusted under 35 U.S.C. 154(b) by 801 days.

(21) Appl. No.: 17/967,801

(22) Filed: Oct. 17, 2022

(65) Prior Publication Data

US 2024/0004071 A1 Jan. 4, 2024

Related U.S. Application Data

(60) Provisional application No. 63/358,051, filed on Jul. 1, 2022.

(51) Int. Cl.
*G01C 3/08* (2006.01)
*G01S 17/32* (2020.01)
*G01S 17/88* (2006.01)
(52) U.S. Cl.
CPC .............. *G01S 17/32* (2013.01); *G01S 17/88* (2013.01)

(58) Field of Classification Search
CPC ................................. G01S 17/32; G01S 17/88
See application file for complete search history.

(56) References Cited

U.S. PATENT DOCUMENTS

2023/0228853 A1* 7/2023 Quintero ............... G01S 7/4863
356/5.01
2023/0288540 A1* 9/2023 Keuleyan ................ G01S 17/10

* cited by examiner

*Primary Examiner* — Mark Hellner
(74) *Attorney, Agent, or Firm* — Womble Bond Dickinson (US) LLP

(57) ABSTRACT

Embodiments of the present disclosure provide a configurable TIA circuit that can be used as both a single-ended "target TIA" and a differential "reference TIA". The configurable TIA may include a first circuit to receive an input from a first photodiode (PD), the first circuit comprising a first switch and a first output buffer. The configurable TIA may also include a second circuit to receive an input from a second PD, the second circuit comprising a second switch and a second output buffer. The first and second switches are configured to operate the first and second circuits as independent signal paths via which the input from the first and second PDs can drive the first and second output buffers respectively in a first mode, and in a second mode, combine the input from the first and second PDs into the first output buffer to generate a single differential output.

20 Claims, 10 Drawing Sheets

300

100

600

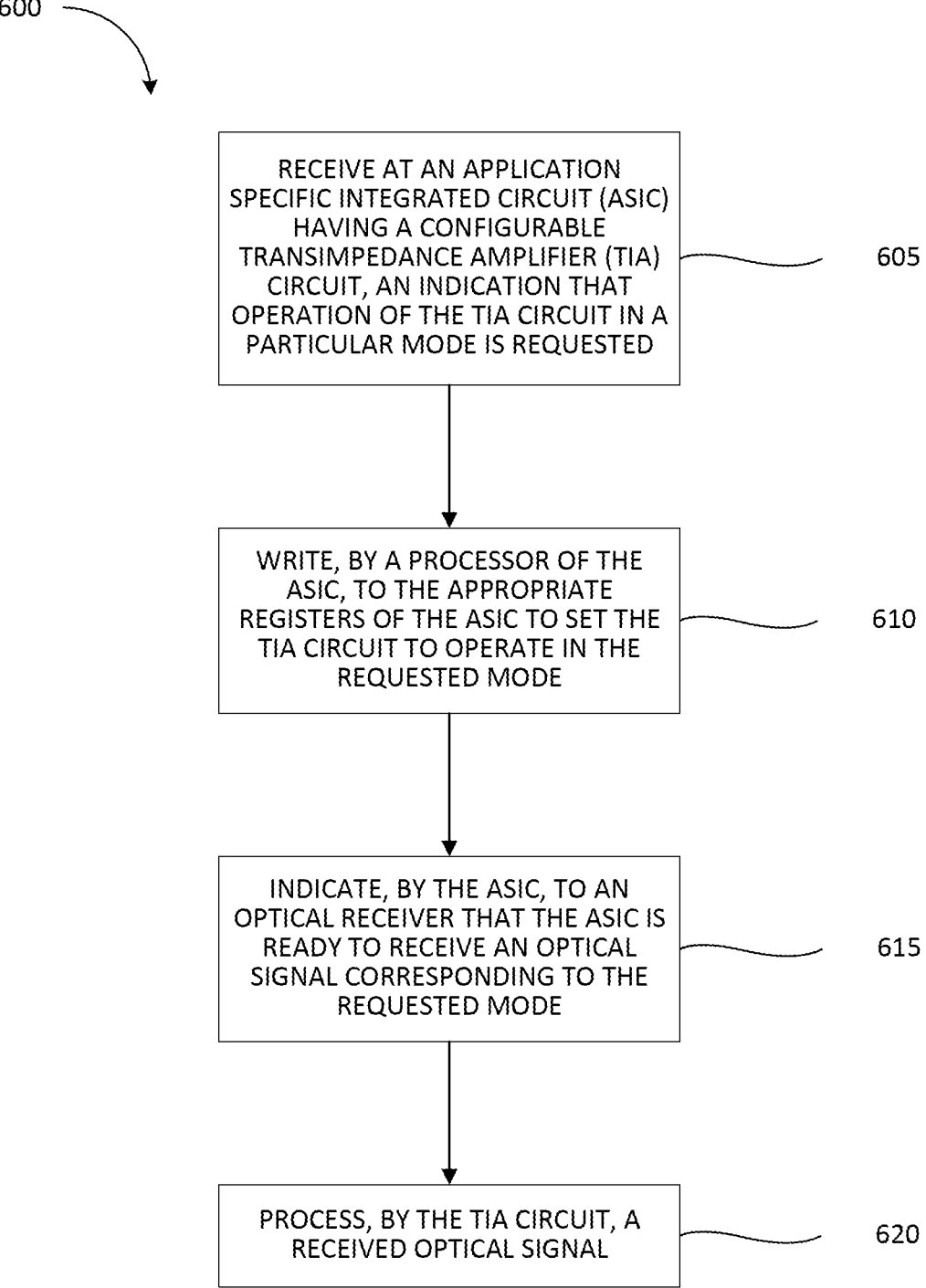

RECEIVE AT AN APPLICATION SPECIFIC INTEGRATED CIRCUIT (ASIC) HAVING A CONFIGURABLE TRANSIMPEDANCE AMPLIFIER (TIA) CIRCUIT, AN INDICATION THAT OPERATION OF THE TIA CIRCUIT IN A PARTICULAR MODE IS REQUESTED — 605

WRITE, BY A PROCESSOR OF THE ASIC, TO THE APPROPRIATE REGISTERS OF THE ASIC TO SET THE TIA CIRCUIT TO OPERATE IN THE REQUESTED MODE — 610

INDICATE, BY THE ASIC, TO AN OPTICAL RECEIVER THAT THE ASIC IS READY TO RECEIVE AN OPTICAL SIGNAL CORRESPONDING TO THE REQUESTED MODE — 615

PROCESS, BY THE TIA CIRCUIT, A RECEIVED OPTICAL SIGNAL — 620

*FIG. 6*

TECHNIQUES FOR CONFIGURABLE TRANSIMPEDANCE AMPLIFIER FOR FMCW LIDAR SYSTEMS

CROSS-REFERENCE TO RELATED APPLICATIONS

This application claims the benefit of U.S. Provisional Application No. 63/358,051, filed on Jul. 1, 2022 and entitled "TECHNIQUES FOR CONFIGURABLE TRANSIMPEDANCE AMPLIFIER FOR FMCW LIDAR SYSTEMS," the disclosure of which is hereby incorporated in its entirety.

TECHNICAL FIELD

The present disclosure relates generally to optical detection, and more particularly to a configurable TIA circuit that can be used as both a single-ended "target TIA" as well as a fully-differential "reference TIA" for use in a frequency-modulated continuous wave (FMCW) light detection and ranging (LIDAR) system.

BACKGROUND

Conventional LIDAR systems are increasingly integrating photodiodes (PDs) into silicon photonics and integrating TIAs into application specific integrated circuits (ASICs) or similar devices. This transition forces new constraints on the TIAs of reference arms used in these designs, causing them to be implemented or optimized for different electrical characteristics than the TIAs in a target arm implemented in the same design. More specifically, in these conventional systems, the target arm's TIA implement a singled-ended interface to a respective PD, whereas the reference arm's TIA may implement a fully-differential interface with the two PDs of the reference arm. This is due, at least in part, to the way that light mixing is achieved in silicon photonics. For example, in one scenario, the reference arm may implement a 2×2 light combiner in which two PDs each receive a local oscillator (LO) signal and a delayed LO signal as inputs (along with the output of e.g., respective waveguides), and thus has 2 outputs as well. Because it is preferable to use both outputs so that there is no loss of signal, the reference arm implements a 2 PD interface with the reference arm TIAs. However, because the target arm uses free space optics, light mixes on the PD of the target arm through alignment in the free space optics and thus the target arm may have a single PD that interfaces with a single TIA.

This results in the reference arm being heavily silicon photonics integrated, while the target arm primarily uses free space optics/discrete components. It is desirable to have a circuit design that works well in both applications. In addition, it is preferable to have a circuit design in which TIAs can interface with PDs differentially instead of a balanced method where PDs are stacked together and TIAs interface with them via an intermediate node without the need for additional external components. Further, because signals from each PD in a reference arm are related to each other, it is desirable to combine them into a single channel and obtain a differential signal.

SUMMARY

Embodiments of the present disclosure provide a configurable TIA circuit that can be used as both a single-ended "target TIA" as well as a fully-differential "reference TIA." By adjusting switches internal to the TIA circuit, it can be changed from a single-ended input to a fully-differential input. This technique allows the same TIA circuit to be used for both reference and target arms of the LIDAR system, removing the need for unique TIAs in each or the need for additional external components. This helps reduce system cost and complexity by reducing the number of unique circuits and ASICs that need to be designed. Although embodiments of the present disclosure are described with respect to TIA circuits that can switch between interfacing with photodiodes (PDs) that are part of target and reference arms, the TIA circuits of the present disclosure are not limited in this way and may also be used to switch between interfacing with PDs for other appropriate purposes e.g., alignment PDs.

In some embodiments, the configurable TIA includes a first circuit to receive an input from a first PD, the first circuit comprising a first amplifier, a first switch, and a first output buffer. The configurable TIA may further include a second circuit to receive an input from a second PD, the second circuit comprising a second amplifier, a second switch, and a second output buffer. In a first mode where the first and second PDs are each part of a respective target arm of the LIDAR system, the first and second switches are configured to operate the first and second circuit respectively as independent signal paths via which the input from the first PD and the input from the second PD can drive the first and second output buffers respectively to generate a signal for calculating a distance of an object relative to the LIDAR system. In a second mode where the first and second PDs are both part of a reference arm of the LIDAR system, the first and second switches are configured to combine the input from the first PD and the input from the second PD into the first output buffer to generate a single differential output for correcting the signal for calculating the distance of the object.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this summary is provided merely for purposes of summarizing some example implementations so as to provide a basic understanding of some aspects of the disclosure. Accordingly, it will be appreciated that the above-described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 6 is a flow diagram illustrating an example method for using a configurable TIA that can switch between operation as a single-ended target TIA as well as a fully-differential reference TIA, according to some embodiments of the present disclosure.

DETAILED DESCRIPTION

Figure 1:
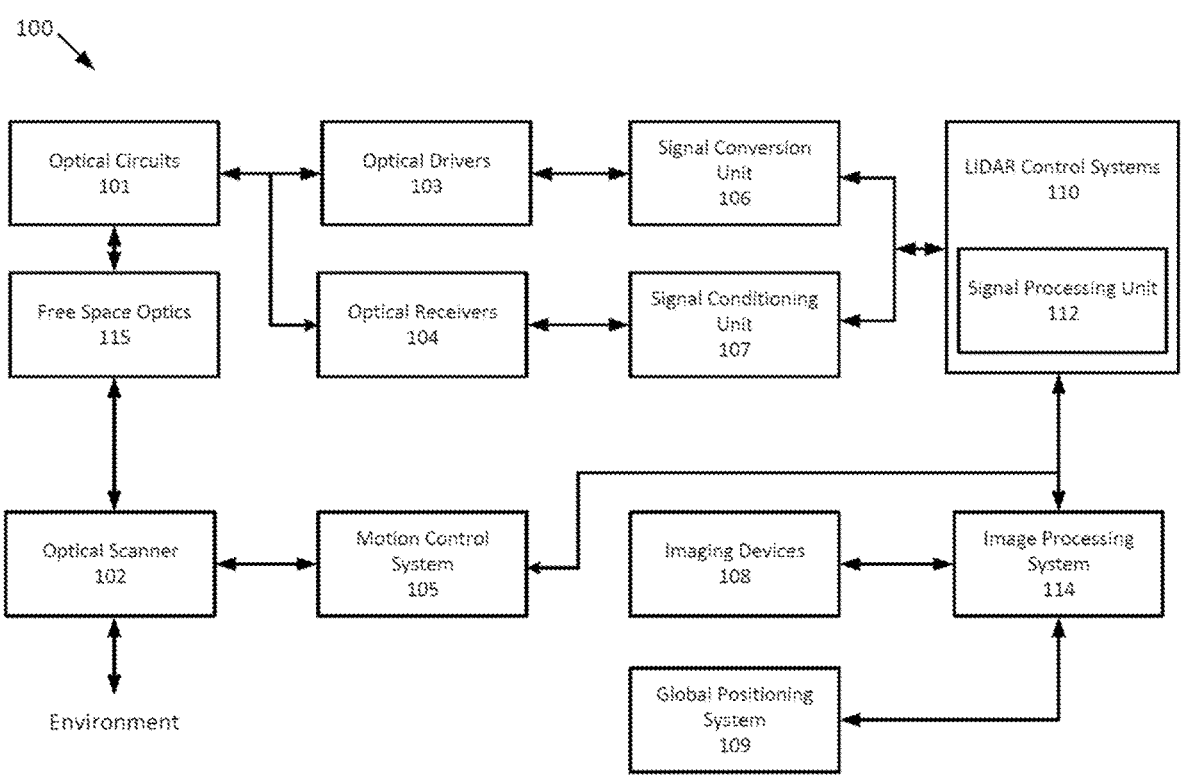
FIG. 1 is a block diagram illustrating an example of a LIDAR system, according to some embodiments of the present disclosure.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free space relative to the vehicle. In some embodiments, the vehicle may include a steering system and a braking system, each of which may work in combination with one or more LIDAR systems 100 according to any information (e.g., distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processing unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104.

Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
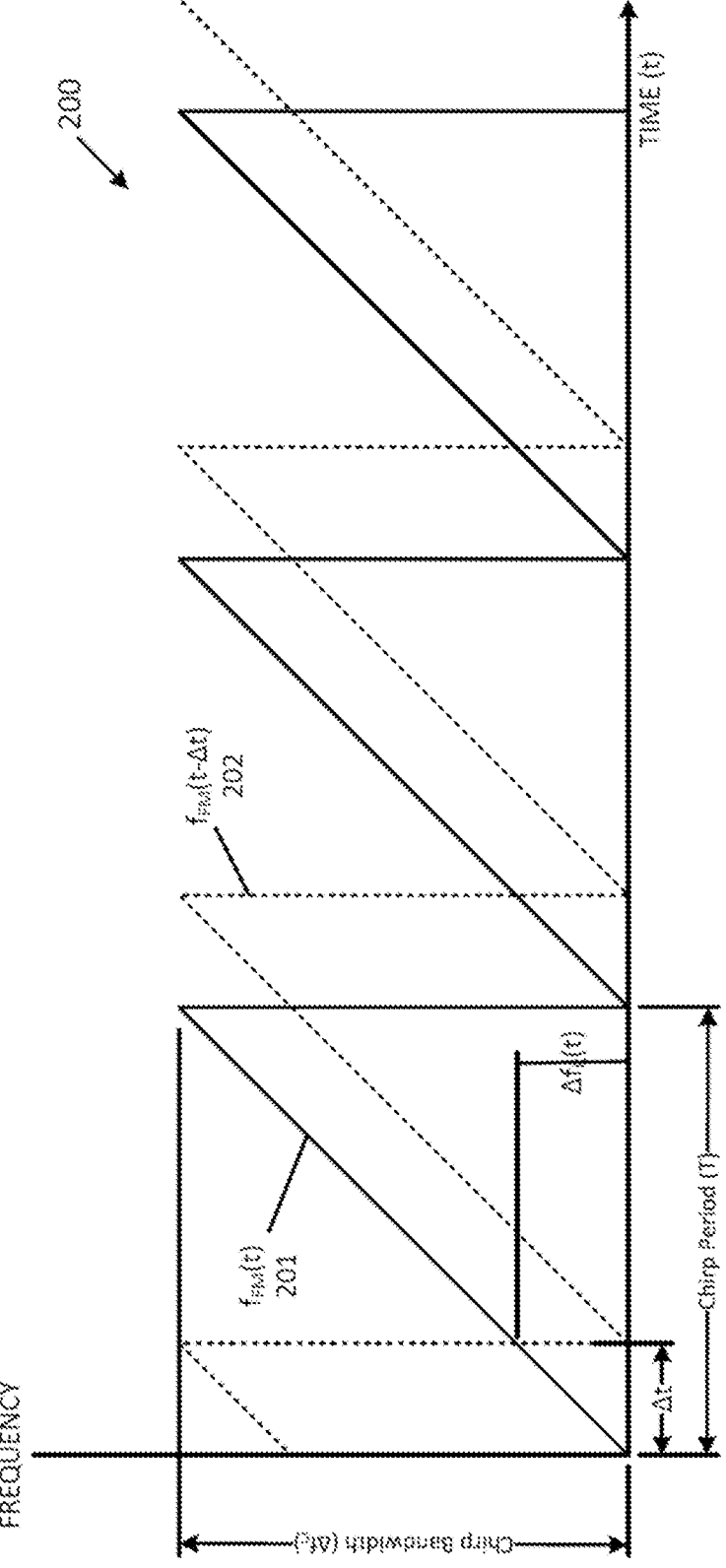
FIG. 2 is a time-frequency diagram illustrating an example of an FMCW scanning signal that can be used by a LIDAR system to scan a target environment, according to some embodiments of the present disclosure.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning waveform 201, where $\Delta t$ is the round trip time to and from a target illuminated by scanning waveform 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{R_{max}}$) is 500 megahertz. This limit in turn determines the maximum range of the system as $R_{max} = (c/2)(\Delta f_{R_{max}}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
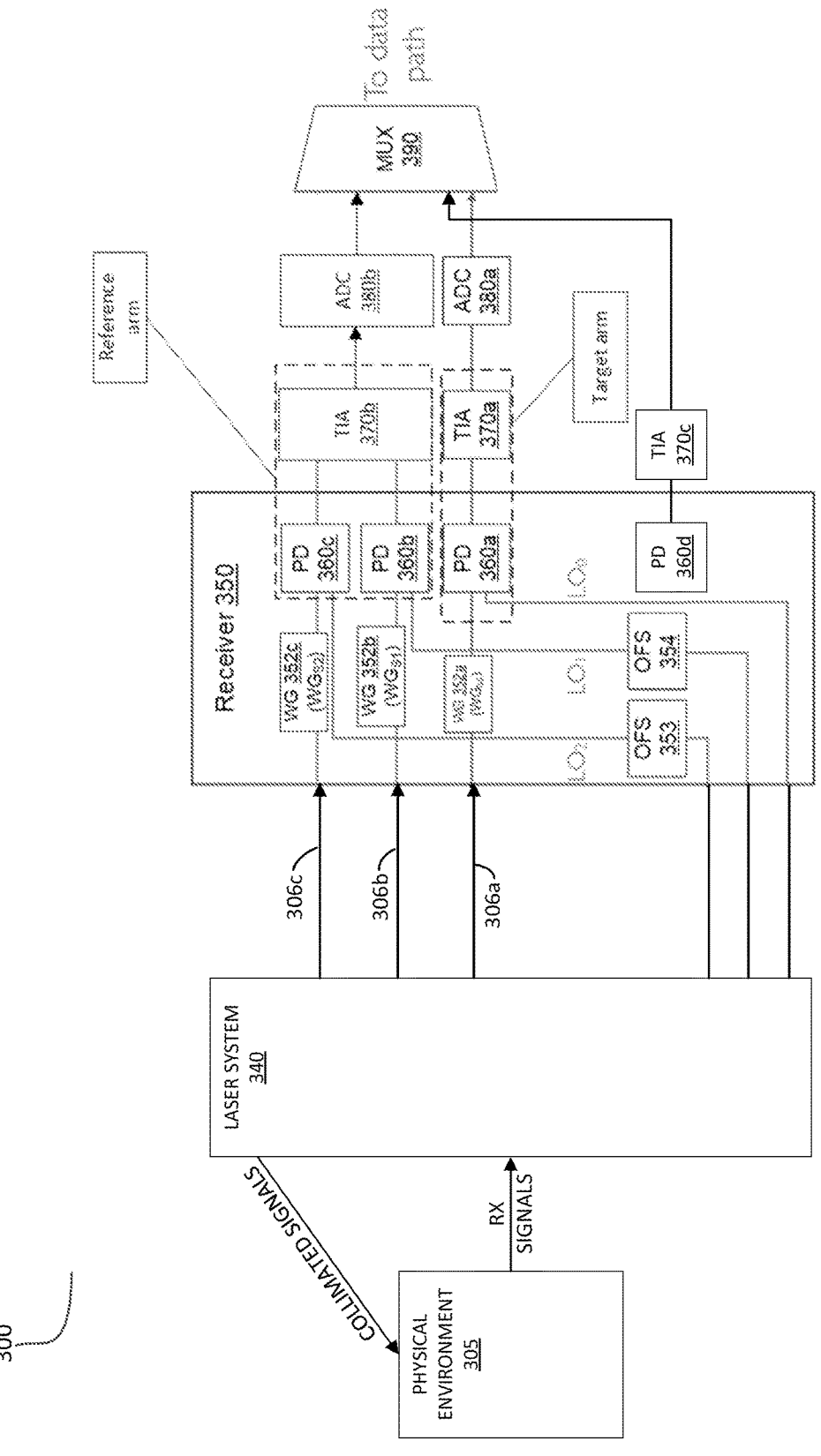
FIG. 3 is a block diagram illustrating an example environment for using array waveguide receivers (AWRs) in the LIDAR system 100 in FIG. 1 to enhance detection of distant objects, according to some embodiments of the present disclosure.

FIG. 3 is a block diagram illustrating an example of a LIDAR system 300 that includes an optical receiver 350, transimpedance amplifiers 370a and 370b (collectively referred to as "TIAs 370"), ADCs 380a and 380b (collectively referred to as, ADCs 380), a laser system 340, and a multiplexer 390 (shown in FIG. 3 as "MUX 390"). The optical receiver 350 includes waveguide (WG) 352a that is configured as the primary on-axis waveguide for receiving a return optical beam 306a from the physical environment 305 responsive to an optical scanner (e.g., optical scanner 102 illustrated in FIG. 1—not shown in FIG. 3) of the laser system 340 transmitting one or more collimated optical beams into free space (e.g., the physical environment 305). The optical receiver 350 includes waveguide (WG) 352b that is configured as an off-axis satellite waveguide for receiving the return optical beam 306b responsive to the optical scanner transmitting the one or more collimated optical beams into free space. The optical receiver 350 includes waveguide (WG) 352c that is configured as an off-axis satellite waveguide for receiving the return optical beam 306c responsive to the optical scanner transmitting the one or more collimated optical beams into free space. Although FIG. 3 shows that the optical receiver 350 includes only a select number of satellite waveguides (e.g., WG 352a, WG 352b, WG 352a), the optical receiver 350 may include any number of satellite waveguides to depending on desired performance and application. It should be noted that although illustrated with respect to PDs (and corresponding TIAs) that are part of reference and target arms, the receiver 350 may include additional PDs that serve other purposes such as PD 360d that serves as alignment PD (illustrated with corresponding TIA 370c—other corresponding hardware not shown). In addition, TIA circuits in accordance with embodiments of the present disclosure may not be limited to switching between interfacing with photodiodes (PDs) that are part of target and reference arms but may also be used to switch between interfacing with PDs for other appropriate purposes.

The optical receiver 350 further includes optical frequency shifters (OFS) 353, 354 and balanced photodiodes (PD) 360a, 360b, 360c (collectively referred to as, "PDs 360"). In some embodiments, the OFSs 353, 354 may be implemented using a variety of PIC architectures including a serrodyne Mach-Zehnder interferometer, a single-sideband modulator, an in-phase/quadrature (I/Q) optical modulator, or adaptations thereof.

In some embodiments, any of the components in the LIDAR system 300 may be added as a component of the LIDAR system 100 in FIG. 1, or may be used to replace or modify any of the one or more components (e.g., free space optics 115, optical circuits, optical receivers 104, etc.) of the LIDAR system 100.

The physical environment 305 may include any number of objects of any type that are within a short distance (e.g., 30 meters) or a long distance (e.g., 300 meters, 500 meters and beyond) from the optical scanner. For example, the physical environment 305 may include one or more objects such as e.g., a street sign, a tree, and a pedestrian (not shown). In some embodiments, an object within the physical environment 305 may be stationary or moving with respect to the optical scanner.

An output terminal of the WG 352c is coupled to a first input terminal of the PD 360c. An output terminal of the WG 352b is coupled to a first input terminal of the PD 360b. An output terminal of the WG 352a is coupled to a first input terminal of the PD 360a.

The output terminals of the PD 360c and the PD 360b are coupled to an input terminal of the TIA 370b, whose output terminal is coupled to an input terminal of the ADC 380b, whose output terminal is coupled to a first input terminal of the MUX 390. An output terminal of the PD 360a is coupled to an input terminal of the TIA 370a, whose output terminal is coupled to an input terminal of the ADC 380a, whose output terminal is coupled to a first input terminal of the MUX 390. FIG. 3 illustrates the reference arm and the target arm of the LIDAR system 300.

In some embodiments, the laser system 340 is configured to generate an optical beam (e.g., light) and is configured to split (e.g., divide, duplicate) the optical beam into a split optical beam (using e.g., a fiber splitter) to propagate along a Tx path, and an LO signal (sometimes referred to as, "an LO beam") to propagate along an LO path. In some embodiments, the laser system 340 may generate a collimated optical beam using the split optical beam (e.g., using a collimator). The laser system 340 may redirect (e.g., using a PBS) the collimated optical beam onto a main Tx/Rx path of the receiver 350 for transmission by the optical scanner. In some embodiments, the laser system 340 may convert (e.g., using a QWP) the collimated optical beam—which is linearly polarized light—into circularly polarized light, which is then directed to free space (e.g., the physical environment 305) via the optical scanner.

In some embodiments, Rx signals (e.g., return optical beam 306a, return optical beam 306b, return optical beam 306c) are generated by the objects in the physical environment 305 and returned to the LIDAR system 300 with opposite circular polarization and an inherent Bis. In some embodiments, the laser system 340 is configured to convert each of the Rx signals to a linear polarization and focus each of the Rx signals onto a respective waveguide (e.g., WG 352a, WG 352b, WG 352c) e.g., using a lens (not shown) of the laser system 340. In some embodiments, light from the LO path of the laser system 340 passes through a polarization controller (not shown) and is coupled onto separate LO paths on the optical receiver 350.

In some embodiments, each satellite LO channel (e.g., the channels associated with WG 352b and WG 352c) is frequency shifted by a unique (e.g., different) amount, whereas the main channel (e.g., the channel associated with WG 352a) remains unshifted. For example, the OFS 353 is configured to frequency shift (and/or phase shift) the light that it receives from the polarization controller 344 by a first offset to generate an LO signal (shown in FIG. 3 as, "$LO_2$"). As another example, the OFS 354 is configured to frequency shift (and/or phase shift) the light that it receives from the polarization controller 344 by a second offset to generate a LO signal (shown in FIG. 3 as, "$LO_1$"). As another example, the light/LO signal (shown in FIG. 3 as, "$LO_0$") that is transmitted from the third terminal of the optical fiber array 348 is not shifted.

Although not shown in FIG. 3, the output of the MUX 390 couples to the LIDAR control system 110 in FIG. 1 to be able to pass any of the optical beams that are received by any of the WGs 352 to the LIDAR control system 110 for processing by the signal processing unit 112.

In some embodiments, some or all of the LO signals are mixed with an Rx signal on a waveguide (e.g., WG 352a, WG 352b, WG 352c), and passed onto a balanced photodiode (e.g., PD 360, PD 362, PD 364). As can be seen, the LIDAR system 300 illustrated in FIG. 3 requires a dedicated PD-TIA-ADC path for each waveguide channel, which in some scenarios may require additional hardware in order to implement multiple TIAs. As discussed above, in some scenarios, it would be beneficial to utilize a TIA circuit that can be used for both the reference and the target arms of a LIDAR system, thereby removing the need for unique TIAs for each arm. This would help reduce system cost and complexity by reducing the number of unique circuits and ASICs that need to be designed.

Figure 4A:
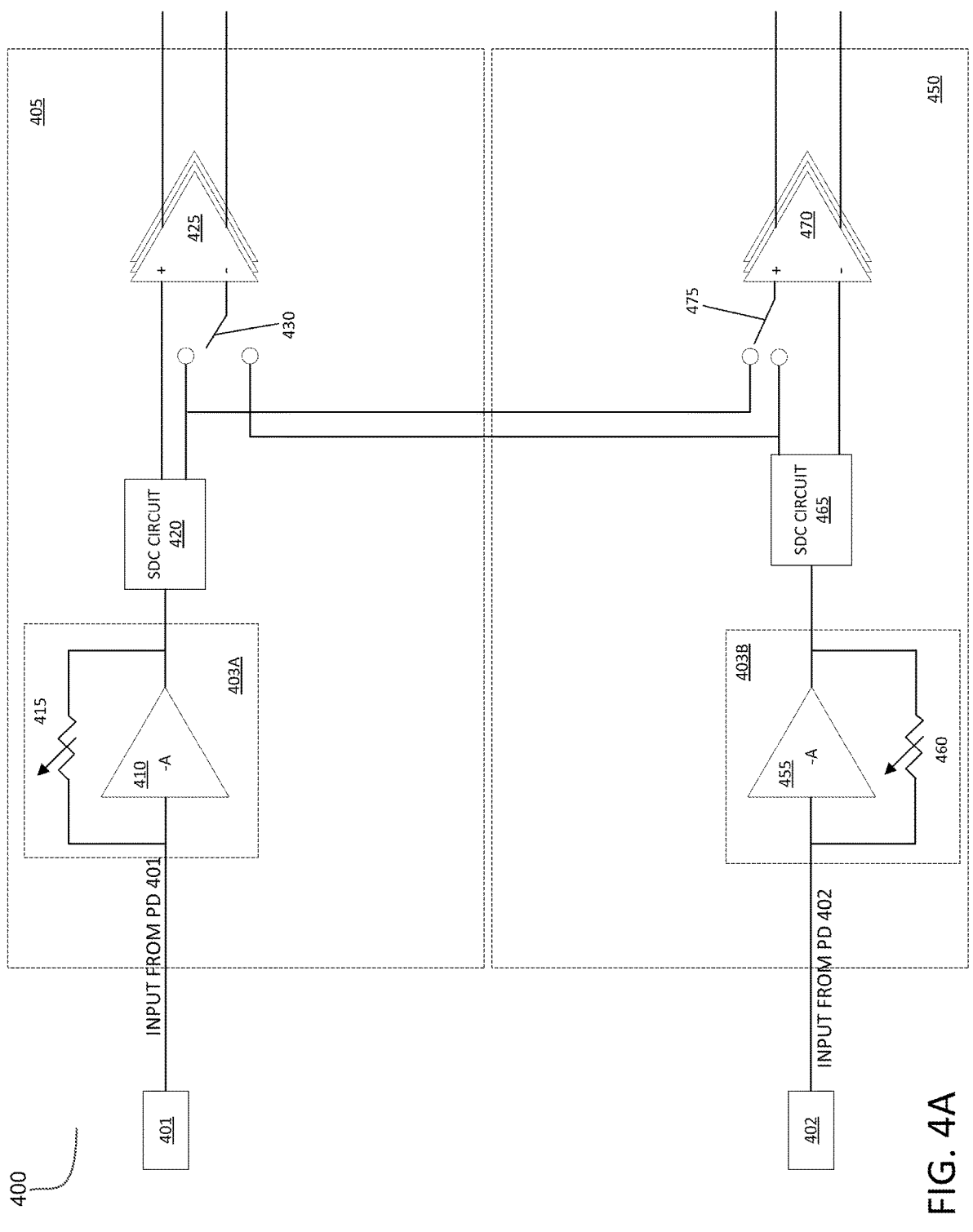
FIGS. 4A-4D are block diagrams illustrating an example TIA circuit, according to some embodiments of the present disclosure.

FIGS. 4A to 4D illustrate a configurable TIA circuit 400 in accordance with some embodiments of the present disclosure. The TIA circuit 400 circuit may operate in a single PD TIA mode (e.g., for operation with target arms) or a dual PD TIA mode (e.g., for operation with a reference arm). FIG. 4A illustrates the TIA circuit 400 when it is not operating in either the single PD TIA or the dual PD TIA mode. The TIA circuit 400 may include 2 circuits 405 and 450 (shown in dashed boxes) that are driven by PD 401 and PD 402 respectively. The two circuits 405 and 450 may operate independently (i.e., separately) in single PD TIA operation, where the signals coming from each PD 401 and 402 are not related, and what is required is two independent signal paths, one for the output of each PD 401 and 402. The two circuits may operate together in dual PD TIA operation where the signals coming from each PD 401 and 402 are related. Each of the circuits 405 and 450 may include a TIA stage 403A and 403B respectively (shown in FIG. 4A). The TIA stage 403A of the circuit 405 may comprise an inverting amplifier 410 with a gain of A, and a shunt feedback resistor 415 that provides feedback.

The amplifier 410 holds the input current at AC ground and reduces the input impedance seen by PD 401, while the signal current flows through feedback resistor 415 and forms a voltage on the other side of the feedback resistor 415 at the output of the amplifier 410. The circuit 405 may also include a single to differential input conversion circuit 420 (referred to herein as SDC circuit 420) that may assist in converting a single ended input from amplifier 410 into a differential input. As shown in FIG. 4A, a first output of the SDC circuit 420 is coupled to the non-inverting input of the output buffer 425. The circuit 405 may further include switch 430 which may function to couple the inverting input of output buffer 425 to a second output of the SDC circuit 420 or to a second output of SDC circuit 465. The circuit 450 may include a TIA stage 403B comprising an inverting amplifier 455 and a shunt feedback resistor 460, a SDC circuit 465 SDC circuit 465, an output buffer 470, and a switch 475, each of which may function similarly to inverting amplifier 410, shunt feedback resistor 415, SDC circuit 420, output buffer 425, and switch 430 of the circuit 405 respectively. A first output of SDC circuit 465 may be coupled to the inverting input of the output buffer 470, while switch 475 may function to couple the non-inverting input of the output buffer 470 to the second output of the SDC circuit 465 or the second output of the SDC circuit 420.

According to some embodiments, each of the switches 430 and 475 may be register controlled switches and may be associated with a respective register of, e.g., an application specific integrated circuit (ASIC) or other integrated system that the TIA circuit 400 is a part of. Thus, each of the switches 430, and 475 can be operated by, e.g., a processor of the relevant system writing to the appropriate registers (e.g., over a communication protocol such as I2C or SPI) to set the TIA circuit 400 in single PD TIA mode or dual PD TIA mode based on whether operation in single PD TIA mode or dual PD TIA mode is required, as discussed in further detail herein.

Figure 4B:
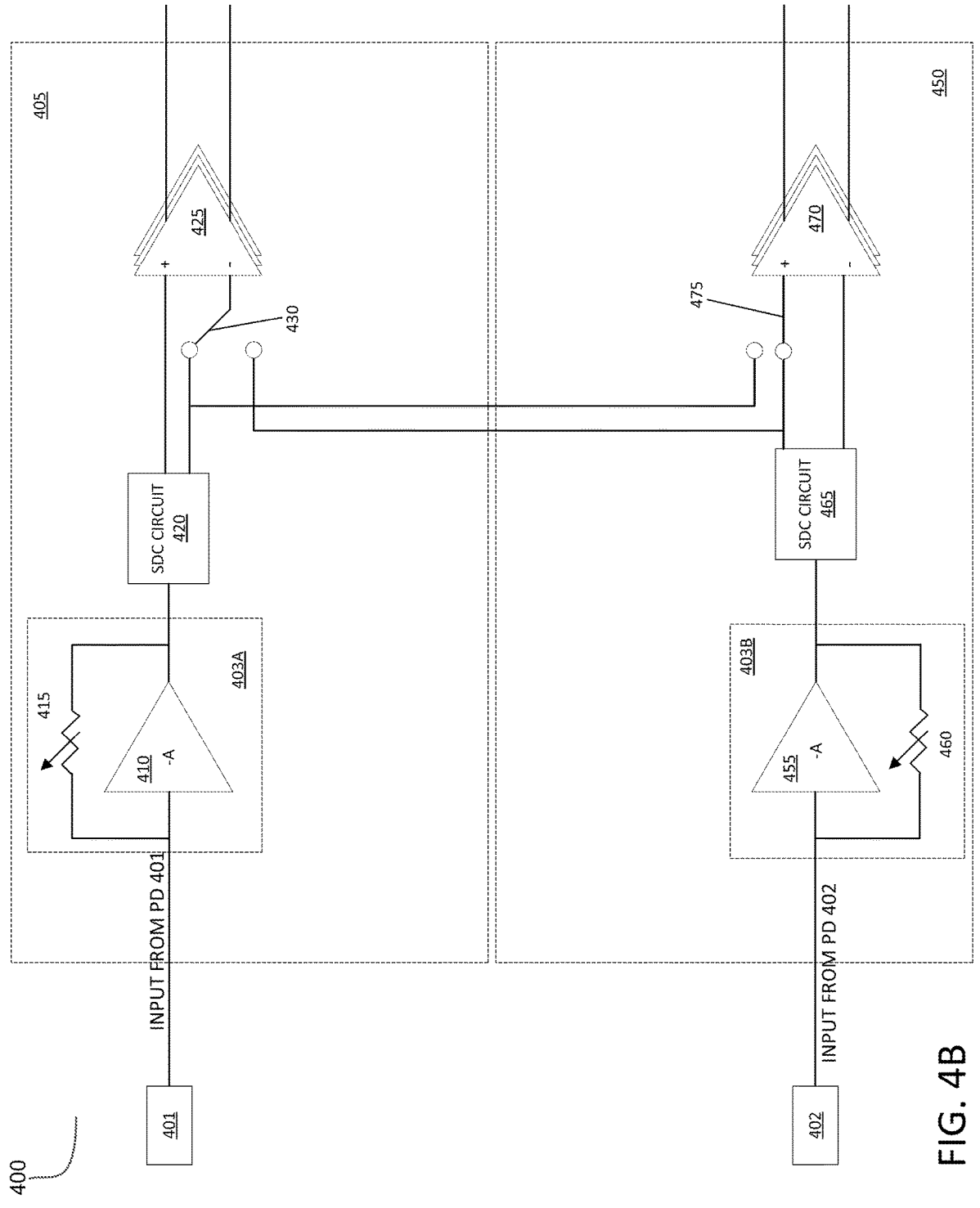

FIG. 4B illustrates the TIA circuit 400 while operating in single PD TIA mode (e.g., when the TIA circuit 400 is interfacing with PDs 401 and 402 that are each part of target arms (i.e., PD 401 is part of a first target arm and PD 402 is part of a second target arm) of the relevant LIDAR environment). As discussed hereinabove, in single PD TIA operation the circuits 405 and 450 are to operate independently of each other as the signals coming from each PD 401 and 402 are not related, and two independent signal paths (one for PD 401 and one for PD 402) are desired. In order to do this, the TIA circuit 400 can reconfigure each of the amplifiers 410 and 455 so that they have a differential output signal (as opposed to a single ended output signal) which allows for improved noise immunity, speed, and performance when the output signal is sent to other components resident on TIA circuit 400 or other systems, components coupled thereto. Differential output signals from the amplifiers 410 and 455 also allow the components of a LIDAR system which the TIA circuit 400 is a part of to operate at lower-supply voltages (i.e., power).

As shown in FIG. 4B, in the circuit 405, the switch 430 couples the inverting input of output buffer 425 to the output of the SDC circuit 420, while in the circuit 450, the switch 475 couples the non-inverting input of the output buffer 470 to the output of the SDC circuit 465. This allows the SDC circuit 420 to receive the single ended output of amplifier 410, convert it to a differential output, and provide the differential output to the output buffer 425. The SDC circuit 465 may receive the single ended output of amplifier 455, convert it into a differential output, and provide the differential output to the output buffer 470. As can be seen, in the configuration illustrated in FIG. 4B, each of the circuits 405 and 450 provides an independent signal path because there are 2 independent PDs 401 and 402 each driving their corresponding output buffer 425 and 470 respectively in a fully differential manner to achieve a fully differential output.

Figure 4C:
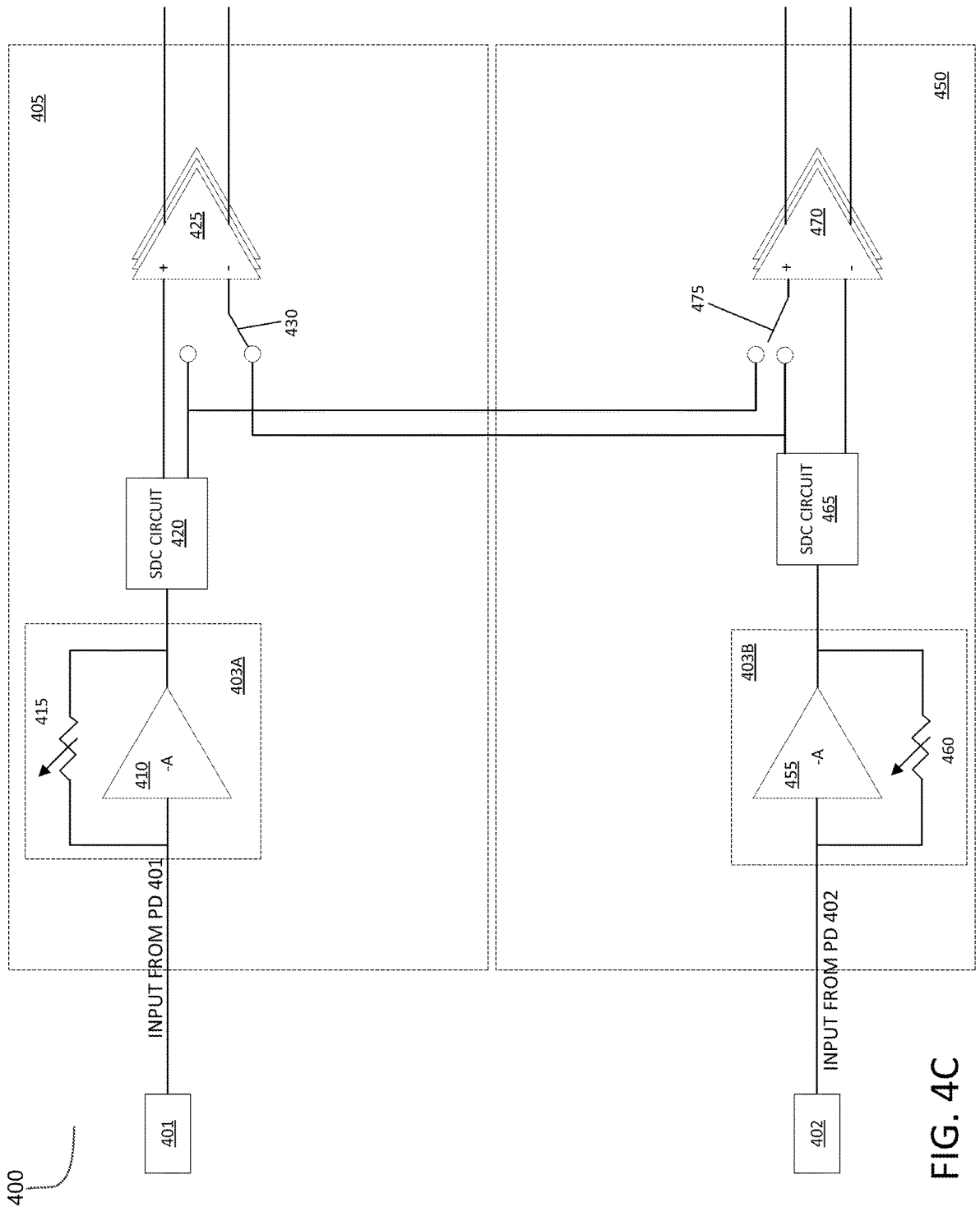

FIG. 4C illustrates the TIA circuit 400 while operating in dual PD TIA mode (e.g., when the TIA circuit 400 is interfacing with PDs 401 and 402 as part of a reference arm of the relevant LIDAR environment). In this mode of operation, the signals of the 2 PDs 401 and 402 that the TIA circuit 400 is interfacing with are correlated/related. Essentially, the DC component of the signal through each of the PDs 401 and 402 is equal to a first order of magnitude, but the AC components of the signals through each of the PDs 401 and 402 are out of phase by 180 degrees. As a result, the TIA circuit 400 is receiving a differential signal (has been made differential in the optics domain) in a single ended manner. Because the TIA circuit 400 is receiving the signal through each of the PDs 401 and 402 in a single ended manner, it combines them so as to generate a single differential output.

As shown in FIG. 4C, the switch 430 may couple the inverting input of output buffer 425 to the second output of SDC circuit 465, while switch 475 may be floating, thereby disabling output buffer 470 as well. As a result, the output of amplifier 410 may be provided directly to the positive terminal of output buffer 425, and the output from amplifier 455 may be provided into the negative terminal of output buffer 425 via switch 430. In this way, 2 single ended outputs are combined into a single output buffer (output buffer 425) so as to generate a single differential output. In some embodiments, the output buffer 425 may have a programmable gain setting that is adjusted e.g., by a processor of the ASIC or other integrated system that the TIA circuit 400 is a part of based on the selected mode of operation of the TIA circuit 400.

Figure 4D:
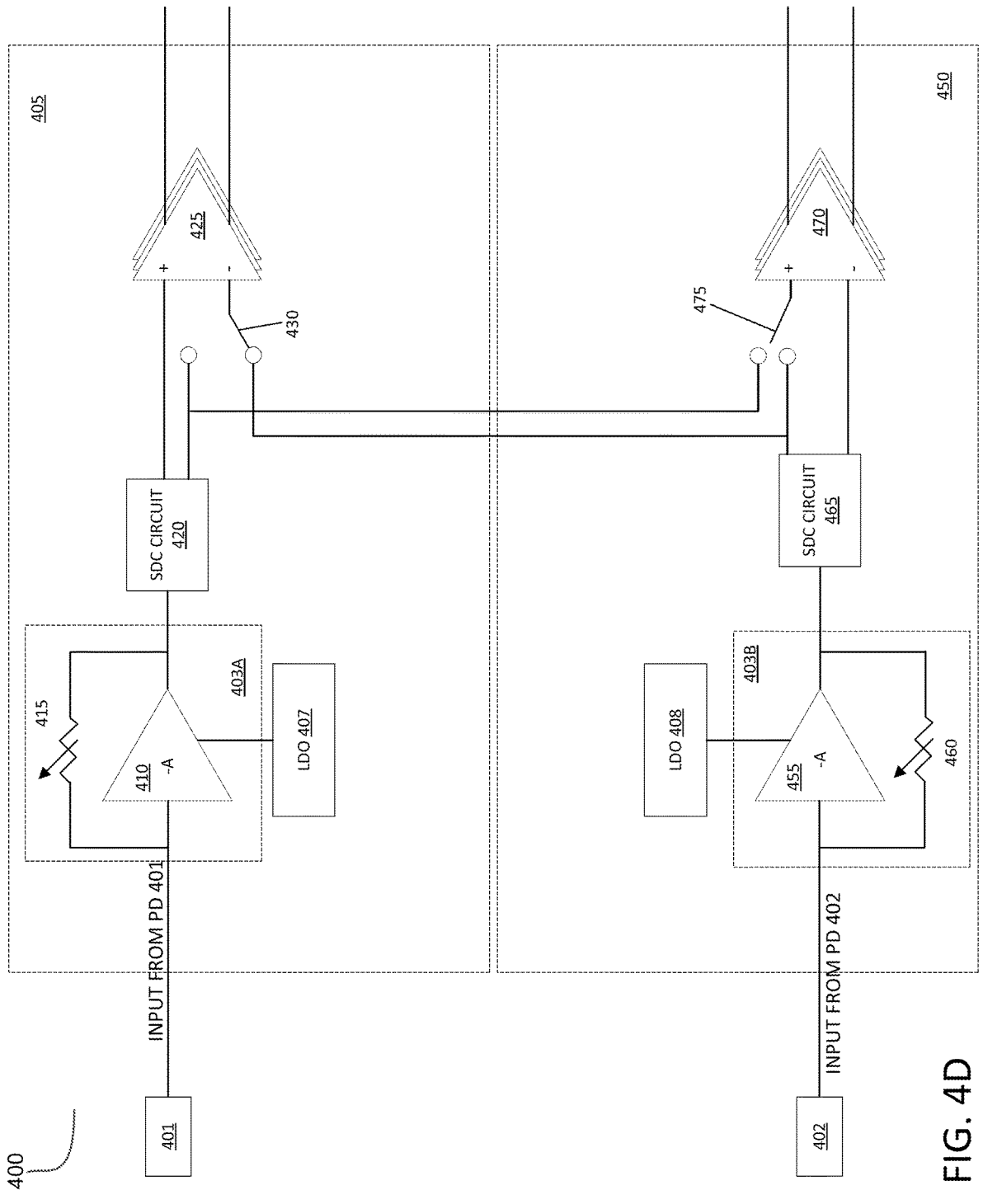

FIG. 4D illustrates the TIA circuit 400 in accordance with some embodiments of the present disclosure. As shown in FIG. 4D, the amplifiers 410 and 455 may each be coupled to a linear dropout (LDO) regulator 407 and 408 respectively. Each LDO 407 and 408 may maintain a power supply rejection ratio for its respective amplifier (e.g., if there is noise sensitivity) and can allow for the use of faster devices by dropping the supply voltage provided to the respective amplifier.

Figure 4E:
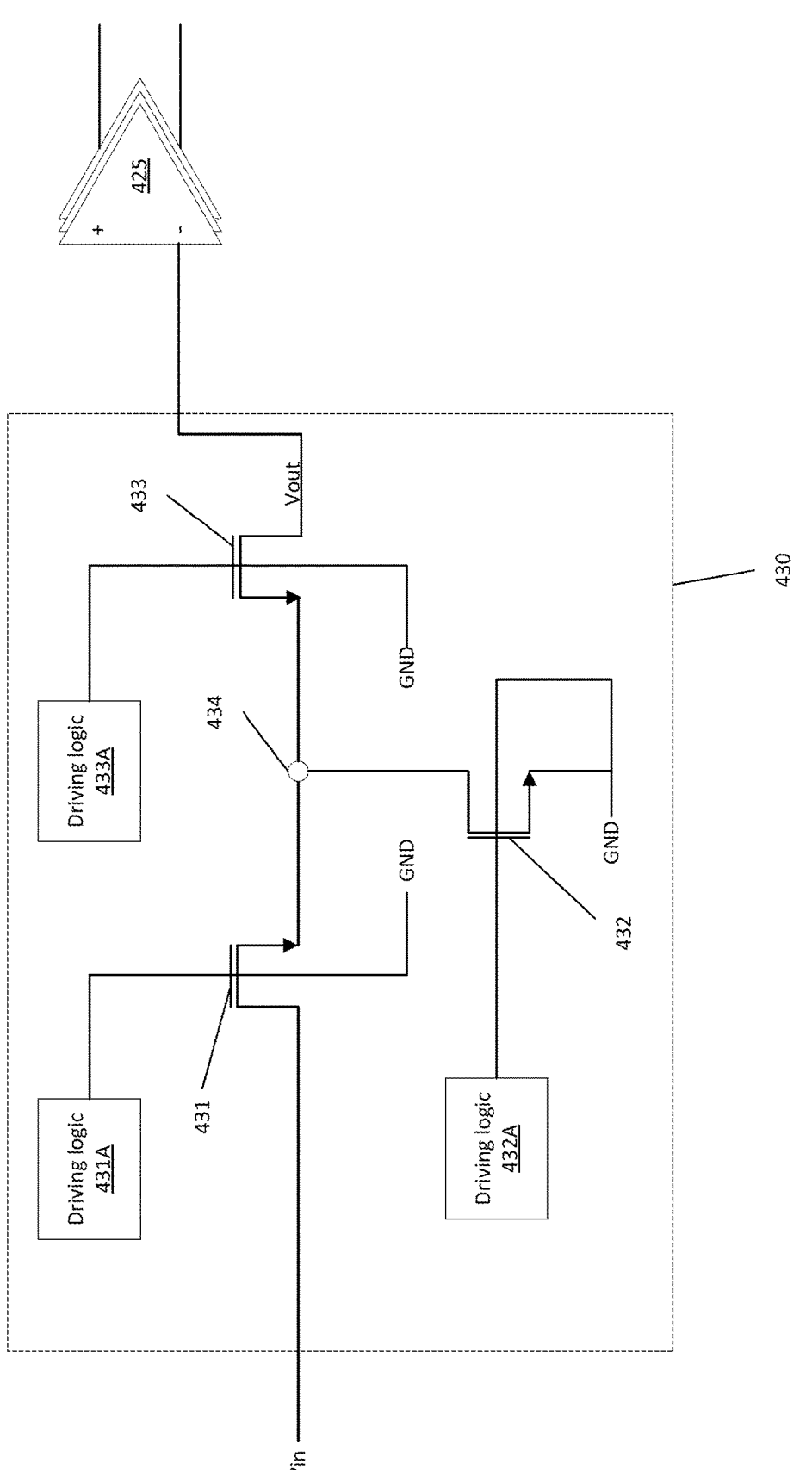
FIG. 4E is a block diagram illustrating an example switch of the example TIA circuit of FIGS. 4A-4D.

FIG. 4E illustrates the switch 430, in accordance with some embodiments of the present disclosure. Switch 430 may be a three-transistor switch (although any appropriate number of transistors may be used), comprising transistors 431, 432, and 433 that together provide the configurability to open and close the switch 430. The input of the switch 430 (Vin) may correspond to either the output of the SDC circuit 420 or the output of the SDC circuit 465 depending on which mode of operation the TIA circuit 400 is configured in. The Vin is input to the transistor 431, and the transistor 433 may provide the output of the switch 430 (Vout) to the output buffer 425 as discussed in further detail herein. The switch 430 may further include an intermediate node 434, to which transistor 432 may be coupled. When the switch 430 is open, the transistor 432 may be pulled to ground, so that any capacitive coupling from the output of the transistor 431 may be shunted away to ground through the transistor 432 before it capacitively couples to the output of the switch 430 (and subsequently causes cross-talk on the adjacent channel—i.e., circuit 450).

The switch 430 may also include switch driving logic 431A, 432A, and 433A, each of which drive their respective transistor with a signal that is logically the same. By having dedicated driving logic to drive each transistor 431, 432, and 433, the capacitive coupling between transistors 431 and 433 is removed. For example, a capacitive coupling path from Vin to the gate of transistor 431 is removed, and a capacitive coupling path from Vout to the gate of transistor 433 is removed. In some embodiments, transistors 431 and 433 may be implemented with a body connection to ground, which also removes capacitive coupling paths from the switch 430.

If the signal from one channel can be seen on an adjacent channel, this results in undesirable cross-talk. The structure of switch 430 may provide better channel to channel isolation by minimizing the number of paths via which signals can cross to different channels, which is particularly important in high frequency applications. This enables the TIA circuit 400 to switch between configurations/modes of operation without compromising performance. Switch 475 may comprise a similar structure to that of switch 430.

Figure 5:
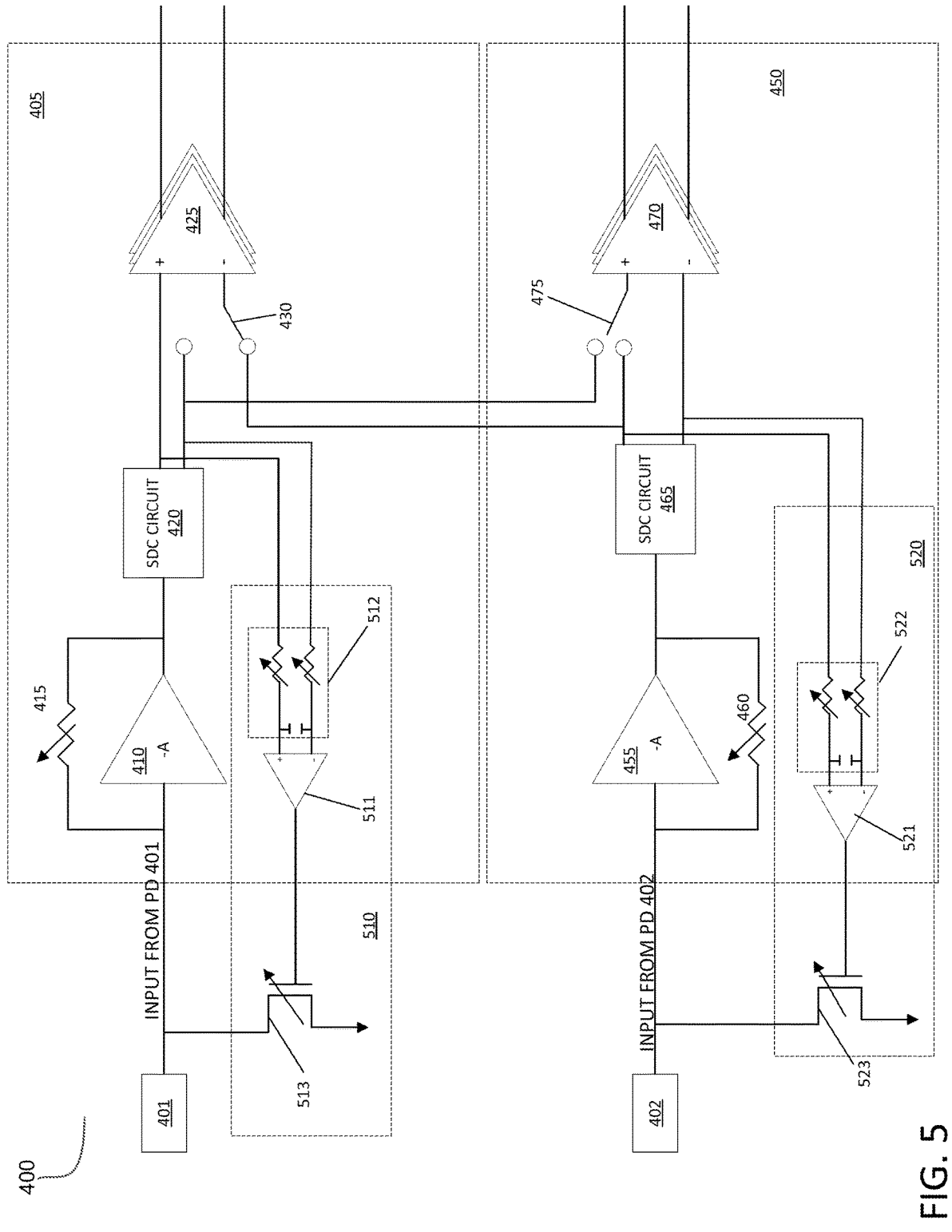
FIG. 5 is a block diagram illustrating an example TIA circuit, according to some embodiments of the present disclosure.

FIG. 5 illustrates the TIA circuit 400 in accordance with some embodiments of the present disclosure where a DC restore circuit is coupled to the input to each of the amplifiers 410 and 455 to optimize noise performance. More specifically, FMCW LIDAR systems are often subject to a large DC component (i.e., noise) on the input signal from the PDs 401 and 402 which is not common to other TIA systems. As a result, in some embodiments the TIA circuit 400 may be configured to optimize noise performance. As shown in FIG. 5, in circuit 405 the output path from the PD 401 to the amplifier 410 may be coupled to a DC restore circuit 510 which may function to remove the DC component of the input signal to the amplifier 410 (the output of the PD 401) so the rest of the circuit 405 only has to operate on the AC component. Similarly, in circuit 450, the output path from the PD 402 to the amplifier 455 may be coupled to a DC restore circuit 520 which may function to remove the DC component of the input signal to the amplifier 455 (the output of the PD 402) so the rest of the circuit 450 only has to operate on the AC component.

Although discussed with respect to removal of noise from the input signals to the amplifiers 410 and 455, the current mirrors 510 and 520 may be used for noise removal in a variety of LIDAR scenarios (e.g., FMCW lidar systems). For instance, in one embodiment, the DC restore circuit 510 may comprise a high gain operational amplifier 511, an RC filter 512, and a transconductance element 513. Similarly, the DC restore circuit 520 may comprise a high gain operational amplifier 521, an RC filter 522, and a transconductance element 523. The noise contributions of the transconductance elements 513 and 523 are critical to the overall noise performance of the TIA circuit 400 since the noise they provide is injected at the input nodes of the TIA circuit 400. By providing programmability in the resistance and transconductance elements of the circuit, the noise performance and circuit stability can be optimized under application specific conditions.

FIG. 6 is a flow diagram illustrating an example method for using a configurable TIA circuit that can be used as both a single-ended "target TIA" as well as a fully differential "reference TIA." In some embodiments, method 600 may be performed by the TIA circuit 400 illustrated in FIG. 4. Each operation may be re-ordered, added, removed, or repeated.

By adjusting switches internal to the TIA circuit, it can be changed from a single-ended input to a fully differential input. This technique allows the same TIA circuit to be used for both reference and target arms of the system, removing the need for unique TIAs in each.

At block 605, an ASIC into which the TIA circuit 400 is integrated may receive an indication that operation of the TIA circuit in a particular mode is required. Each of the switches 430 and 475 may be register controlled switches and may be associated with a respective register of the ASIC (or other appropriate integrated system) that the TIA circuit 400 is a part of. The configuration of switches 430 and 475 required for each mode of operation (i.e., single PD or dual PD) may be stored in a memory of the ASIC and retrieved by a processor of the ASIC when a request to configure the TIA circuit 400 for a particular mode of operation is received. At block 610, the processor of the ASIC may write to the appropriate registers (e.g., over a communication protocol such as I2C) to set the TIA circuit 400 to operate in the requested mode.

For example, if a request to operate the TIA circuit 400 in single PD mode is received, the processor of the ASIC may obtain the switch configuration for single PD operation from memory, and write to the appropriate registers such that switch 430 couples the inverting input of output buffer 425 to the output of the SDC circuit 420, while in the circuit 450, the switch 475 couples the non-inverting input of the output buffer 470 to the output of the SDC circuit 465. This allows the SDC circuit 420 to receive the single ended output of amplifier 410, convert it to a differential output, and provide the differential output to the output buffer 425. The SDC circuit 465 may receive the single ended output of amplifier 455, convert it into a differential output, and provide the differential output to the inverting input of output buffer 470. As can be seen, in the configuration illustrated in FIG. 4B, each of the circuits 405 and 450 provides an independent signal path because there are 2 independent PDs 401 and 402 each driving their corresponding output buffer 425 and 470 respectively in a fully differential manner to achieve a fully differential output.

At block 615, the processor of the ASIC may indicate to an optical receiver that it is ready to receive an optical signal corresponding to the requested mode. In the example of single PD operation, the processor of the ASIC may indicate to a target optical receiver that it is ready to receive an optical signal carrying information about the range and velocity of a target in the form of a beat frequency modulated optical signal. At block 620, the TIA circuit 400 may process the received optical signal.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system comprising:

a first circuit to receive an input from a first photodiode (PD), the first circuit comprising a first amplifier, a first switch, and a first output buffer; and a second circuit to receive an input from a second PD, the second circuit comprising a second amplifier, a second switch, and a second output buffer, wherein the first and second switches are configured to:

in a first mode, operate the first and second circuit respectively as independent signal paths wherein the input from the first PD and the input from the second PD drive the first and second output buffers respectively; and in a second mode, combine the input from the first PD and the input from the second PD into the first output buffer to generate a single differential output comprising an increased signal-to-noise ratio (SNR) for receipt by one or more components residing on the LIDAR system.

2. The LIDAR system of claim 1, further comprising:

a first single to differential (SDC) converter to convert the input from the first PD into a first differential output, a first switch; and a second SDC converter to convert the input from the second PD into a second differential output, wherein to operate the first and second circuit respectively as independent signal paths, the first and second switches are configured to:

connect the first differential output to an inverting input and a non-inverting input of the first output buffer and connect the second differential output to an inverting input and a non-inverting input of the second output buffer.

3. The LIDAR system of claim 1, wherein to combine the input from the first PD and the input from the second PD into the first output buffer, the second switch is configured to operate in a floating state and the first switch is configured to:

couple the inverting input of the first output buffer to the second differential output.

4. The LIDAR system of claim 1, further comprising:

a first dropout regulator coupled to the first amplifier; and a second dropout regulator coupled to the second amplifier, wherein the first and second dropout regulators are to maintain a power supply rejection ratio for the first and second amplifier respectively.

5. The LIDAR system of claim 1, further comprising:

a first feedback resistor to provide feedback to the first amplifier; and a second feedback resistor to provide feedback to the second amplifier.

6. The LIDAR system of claim 1, wherein the first and second switches comprise a first and second set of registers respectively, and wherein the first and second switches operate in the first mode or the second mode based on signals received at the first and second set of registers.

7. The LIDAR system of claim 1, wherein the first and second switches each comprise:

a set of transistors to open and close the switch based on whether the switch is operating in the first mode or the second mode, wherein a first transistor of the set of transistors operates as a pull-down transistor.

8. The LIDAR system of claim 7, wherein the first and second switches each further comprise:

corresponding driving logic for each of their respective set of transistors to minimize capacitive coupling pathways within the switch.

9. The LIDAR system of claim 1, further comprising:

a first DC restore circuit coupled between the first PD and the first circuit; and a second DC restore circuit coupled between the second PD and the second circuit, wherein the first DC restore circuit and the second DC restore circuit are configured to remove a DC component of an input signal to the first amplifier and the second amplifier respectively.

10. A light detection and ranging (LIDAR) system comprising:

a first photodiode (PD) to receive an optical signal and generate an output of the first PD;

a second PD to receive the optical signal and generate an output of the second PD;

a processor; and a transimpedance amplifier comprising:

a first circuit to receive the output of the first PD, the first circuit comprising a first amplifier, a first switch, and a first output buffer; and a second circuit to receive the output of the second PD, the second circuit comprising a second amplifier, a second switch, and a second output buffer, wherein the first and second switches are configured, based on input from the processing device, to:

in a first mode where the first and second PDs are each part of a respective target arm of the LIDAR system, operate the first and second circuit respectively as independent signal paths wherein the output of the first PD and the output of the second PD drive the first and second output buffers respectively to generate a signal for calculating a distance of an object relative to the LIDAR system; and in a second mode where the first and second PDs are both part of a reference arm of the LIDAR system, combine the output of the first PD and the output of the second PD into the first output buffer to generate a single differential output for correcting the signal for calculating the distance of the object, the single differential output comprising an increased signal-to-noise ratio (SNR) for receipt by one or more components residing on the LIDAR system.

11. The LIDAR system of claim 10, wherein the first and second switches comprise a first and second set of registers respectively, and wherein the processing device operates the transimpedance amplifier in the first mode or the second mode by sending signals to the first and second set of registers.

12. The LIDAR system of claim 10, wherein the transimpedance amplifier further comprises:

a first single to differential (SDC) converter to convert the output of the first PD into a first differential output; and a second SDC converter to convert the output of the second PD into a second differential output, wherein to operate the first and second circuit respectively as independent signal paths, the first and second switches are configured to:

connect the first differential output to an inverting input and a non-inverting input of the first output buffer and connect the second differential output to an inverting input and a non-inverting input of the second output buffer.

13. The LIDAR system of claim 10, wherein to combine the output from the first PD and the output from the second PD into the first output buffer, the second switch is configured to operate in a floating state and the first switch is configured to:

couple the inverting input of the first output buffer to the second differential output.

14. The LIDAR system of claim 10, wherein the transimpedance amplifier further comprises:

a first dropout regulator coupled to the first amplifier; and a second dropout regulator coupled to the second amplifier, wherein the first and second dropout regulators are to maintain a power supply rejection ratio for the first and second amplifier respectively.

15. The LIDAR system of claim 10, wherein the transimpedance amplifier further comprises:

a first feedback resistor to provide feedback to the first amplifier; and a second feedback resistor to provide feedback to the second amplifier.

16. The LIDAR system of claim 10, wherein the first and second switches each comprise:

a set of transistors to open and close the switch based on whether the switch is operating in the first mode or the second mode, wherein a first transistor of the set of transistors operates as a pull-down transistor.

17. The LIDAR system of claim 16, wherein the first and second switches each further comprise:

corresponding driving logic for each of their respective set of transistors to minimize capacitive coupling pathways within the switch.

18. The LIDAR system of claim 10, wherein the transimpedance amplifier further comprises:

a first DC restore circuit coupled between the first PD and the first circuit; and a second DC restore circuit coupled between the second PD and the second circuit, wherein the first DC restore circuit and the second DC restore circuit are configured to remove a DC component of an input signal to the first amplifier and the second amplifier respectively.

19. A method comprising:

receiving an indication that operation of a transimpedance circuit of a in a first mode or a second mode is requested, wherein the transimpedance circuit is part of a light detection and ranging (LIDAR) system and comprises:

a first circuit to receive an input from a first photodiode (PD), the first circuit comprising a first amplifier, a first switch, and a first output buffer; and a second circuit to receive an input from a second PD, the second circuit comprising a second amplifier, a second switch, and a second output buffer;

writing to one or more registers of the transimpedance circuit to configure the transimpedance circuit in the requested mode;

in response to the requested mode corresponding to the first mode, operating the first and second circuit respectively as independent signal paths wherein the input from the first PD and the input from the second PD drive the first and second output buffers respectively to generate a signal for calculating a distance of an object relative to the LIDAR system, and wherein the first and second PDs are each part of a respective target arm of the LIDAR system in the first mode; and in response to the requested mode corresponding to the second mode, combining the input from the first PD and the input from the second PD into the first output buffer to generate a single differential output for correcting the signal for calculating the distance of the object, wherein the first and second PDs are both part of a reference arm of the LIDAR system and wherein the single differential output comprises an increased signal-to-noise ratio (SNR) for receipt by one or more components residing on the LIDAR system.

20. The method of claim 19, wherein the transimpedance amplifier further comprises a first single to differential (SDC) converter and a second SDC converter, the method further comprising:

converting, by the first SDC converter, the input from the first PD into a first differential output; and converting, by the second SDC converter, the input from the second PD into a second differential output, and wherein operating the first and second circuit respectively as independent signal paths comprises:

connecting the first differential output to an inverting input and a non-inverting input of the first output buffer and connecting the second differential output to an inverting input and a non-inverting input of the second output buffer.

* * * * *